United States Patent
Tabuchi

(10) Patent No.: US 12,401,250 B2
(45) Date of Patent: Aug. 26, 2025

(54) ROTARY ACTUATOR

(71) Applicant: DENSO CORPORATION, Kariya (JP)

(72) Inventor: Toru Tabuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 285 days.

(21) Appl. No.: 17/944,532

(22) Filed: Sep. 14, 2022

(65) Prior Publication Data

US 2023/0015043 A1   Jan. 19, 2023

Related U.S. Application Data

(63) Continuation of application No. PCT/JP2021/010361, filed on Mar. 15, 2021.

(30) Foreign Application Priority Data

Mar. 19, 2020 (JP) ................................ 2020-049085

(51) Int. Cl.
*H02K 5/10* (2006.01)
*H02K 5/173* (2006.01)
*H02K 7/116* (2006.01)

(52) U.S. Cl.
CPC .............. *H02K 5/10* (2013.01); *H02K 5/173* (2013.01); *H02K 7/116* (2013.01)

(58) Field of Classification Search
CPC ........... H02K 7/116; H02K 5/10; H02K 5/173
See application file for complete search history.

(56) References Cited

U.S. PATENT DOCUMENTS

| | | | |
|---|---|---|---|
| 4,987,795 A | 1/1991 | Nguyen | |
| 5,911,793 A | 6/1999 | Kaye | |
| 2007/0205680 A1 | 9/2007 | Miyoshi et al. | |
| 2013/0193812 A1 | 8/2013 | Oishi | |
| 2018/0223973 A1* | 8/2018 | Uematsu | ............. F16H 25/2015 |
| 2019/0207462 A1* | 7/2019 | Uematsu | ................ H02K 11/33 |

FOREIGN PATENT DOCUMENTS

| | | |
|---|---|---|
| CN | 204136005 | 2/2015 |
| JP | 63-88051 | 6/1988 |
| JP | 2004-120847 | 4/2004 |
| JP | 2009-296811 | 12/2009 |

(Continued)

OTHER PUBLICATIONS

Kimura (WO 2018079418 A1) English Translation. (Year: 2018).*
Shibata (JP 2009296811 A) English Translation (Year: 2009).*

*Primary Examiner* — Tulsidas C Patel
*Assistant Examiner* — Robert E Mates
(74) *Attorney, Agent, or Firm* — Nixon & Vanderhye P.C.

(57) ABSTRACT

A rotary actuator includes a motor, a speed reducer configured to output after reducing a rotation of a rotary shaft of the motor, and a housing accommodating the motor and the speed reducer. The rotary actuator includes a bearing having an inner ring fixed to the rotary shaft and rotatably supporting the rotary shaft, and a cylindrical outer ring fixing portion integrally provided on the housing so as to fix an outer ring of the bearing. A front housing has a jig insertion hole into which an inner ring receiving jig can be inserted, and the jig insertion hole has an opening that overlaps with at least a part of one end surface of the inner ring in view from an axial direction.

4 Claims, 16 Drawing Sheets

(56) References Cited

FOREIGN PATENT DOCUMENTS

| JP | 2009296811 A | * | 12/2009 | ............. F16C 27/04 |
| --- | --- | --- | --- | --- |
| JP | 2017-125513 | | 7/2017 | |
| JP | 6485365 | | 3/2019 | |
| JP | 2019-68518 | | 4/2019 | |
| WO | WO-2018079418 A1 | * | 5/2018 | ............... F16H 1/32 |

* cited by examiner

ROTARY ACTUATOR

CROSS REFERENCE TO RELATED APPLICATIONS

This application is a continuation application of International Patent Application No. PCT/JP2021/010361 filed on Mar. 15, 2021, which designated the U.S. and based on and claims the benefits of priority of Japanese Patent Application No. 2020-049085 filed on Mar. 19, 2020. The entire disclosure of all of the above applications is incorporated herein by reference.

TECHNICAL FIELD

The present disclosure relates to a rotary actuator.

BACKGROUND

Conventionally, a rotary actuator including a motor and a speed reducer for reducing a rotation of the motor is known.

SUMMARY

An object of the present disclosure is to provide a rotary actuator that is easy to manufacture while increasing and stabilizing a magnetic force of a position detection unit.

A rotary actuator of the present disclosure includes a motor, a speed reducer that outputs after reducing a rotation of a rotary shaft of the motor, a housing containing the motor and the speed reducer, a bearing that has an inner ring fixed to the rotating shaft and rotatably supports the rotary shaft, and a cylindrical outer ring fixing portion that is integrally provided in the housing and fixes the outer ring of the bearing.

The housing has a jig insertion hole into which an inner ring receiving jig can be inserted, and the jig insertion hole has an opening that overlaps with at least a part of one end surface of the inner ring in view from an axial direction.

BRIEF DESCRIPTION OF DRAWINGS

The above and other objects, features and advantages of the present disclosure will become more apparent from the following detailed description taken in conjunction with the accompanying drawings.

In the drawings.

DETAILED DESCRIPTION

Figure 1:
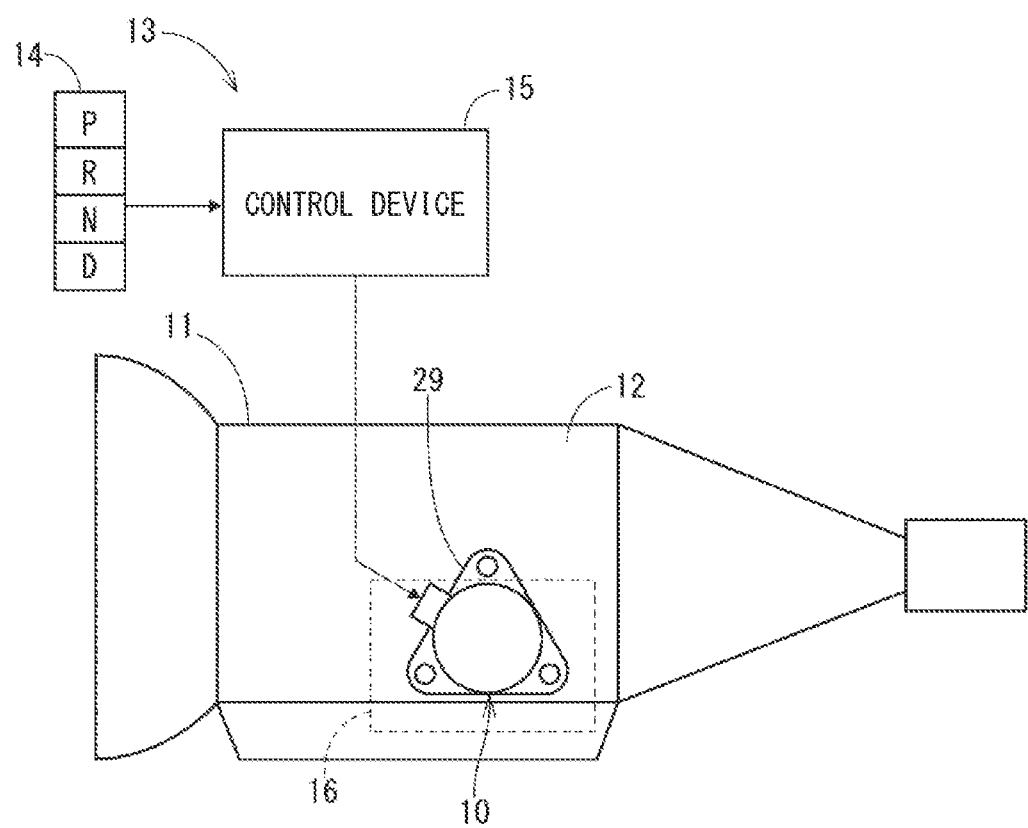
FIG. 1 is a schematic diagram illustrating a shift-by-wire system to which a rotary actuator of a first embodiment is applied.

In an assumable example, a rotary actuator including a motor and a speed reducer for reducing a rotation of the motor is known. In the rotary actuator, a metal plate is insert-molded into a resin housing. An outer ring of a bearing is press-fitted into the metal plate to be fixed, and a rotary shaft of the motor is press-fitted into an inner ring of the bearing to be fixed. As a result, an amount of variation in a gap between a position detection sensor for a rotor and a magnet is reduced, and a magnetic force acting on the sensor is increased and stabilized.

In the embodiment of fixing both the outer ring and the inner ring of the bearing, it is necessary to receive a force applied to the inner ring when the rotary shaft is press-fitted into the inner ring after the outer ring is press-fitted to be fixed. In a first embodiment, a plurality of points in a circumferential direction of a flat base portion of the metal plate are bent to form an outer ring fixing portion, and the rest of the base portion forms an inner ring receiving portion. Further, in a second embodiment, after the base portion is projected in an axial direction as a whole, the inside of the protruding portion is recessed in an opposite direction. A side surface of the recessed portion forms the outer ring fixing portion, and a bottom surface of the recessed portion forms the inner ring receiving portion. However, both embodiments are difficult to manufacture. In the first embodiment, a holding force of the outer ring is low, and in the second embodiment, there is a concern about cracking of the bearing during manufacturing.

An object of the present disclosure is to provide a rotary actuator that is easy to manufacture while increasing and stabilizing the magnetic force of the position detection unit.

A rotary actuator of the present disclosure includes a motor, a speed reducer that outputs after reducing a rotation of a rotary shaft of the motor, a housing containing the motor and the speed reducer, a bearing that has an inner ring fixed to the rotating shaft and rotatably supports the rotary shaft, and a cylindrical outer ring fixing portion that is integrally provided in the housing and fixes the outer ring of the bearing.

The housing has a jig insertion hole into which an inner ring receiving jig can be inserted, and the jig insertion hole has an opening that overlaps with at least a part of one end surface of the inner ring in view from an axial direction.

By providing such a jig insertion hole, the inner ring can be received by the inner ring receiving jig inserted into the jig insertion hole at the time of assembly. Therefore, it is not necessary to provide the inner ring receiving portion integrally with the outer ring fixing portion. Therefore, by fixing both the outer ring and the inner ring of the bearing, the magnetic force of the position detection unit is increased and stabilized, and the outer ring fixing portion can be made into a simple cylindrical shape, which makes it easy to manufacture.

Hereinafter, a plurality of embodiments of a rotary actuator (hereinafter, referred to as an "actuator") will be described with reference to the drawings. In the embodiments, components which are substantially similar to each other are denoted by the same reference numerals and redundant description thereof is omitted.

First Embodiment

As shown in FIG. 1, an actuator 10 of the first embodiment is fixed to an outer wall of a case 12 of a vehicle transmission 11 and is used as a power source of a shift-by-wire system 13. The actuator 10 is driven and controlled by a control device 15 in response to a command signal from a shift operation device 14 to operate a shift range switching mechanism 16 of the vehicle transmission 11 to switch a shift range.

(Actuator)

First, an overall configuration of the actuator 10 will be described with reference to FIG. 2. The actuator 10 includes a housing 20, a motor 30, and a speed reducer 40.

The housing 20 has a cup-shaped front housing 21 and a cup-shaped rear housing 22. An opening of the front housing 21 and an opening of the rear housing 22 are combined, and the front housing 21 and the rear housing 22 are fastened to each other by bolts 23. A bottomed cylindrical metal plate 24 is embedded in the front housing 21. The rear housing 22 has a tubular protrusion 28 that projects to an opposite side of the front housing 21. A bracket 29 is fixed to an outer wall of the rear housing 22. The actuator 10 is fixed to the case 12 (see FIG. 1) of the transmission 11 by using the bracket 29.

The motor 30 has a stator 31 and a rotor 34. The stator 31 has a stator core 32 fixed to the metal plate 24 by, for example, press fitting, and a coil 33 provided on the stator core 32. The rotor 34 has a rotary shaft 37 rotatably supported around a rotary shaft center AX1 by a motor side bearing 35 and a speed reducer side bearing 36, and a rotor core 38 fitted and fixed to an outside of the rotary shaft 37. The motor side bearing 35 is provided on the metal plate 24. The speed reducer side bearing 36 is provided on an output member 44, which will be described later.

The speed reducer 40 includes an eccentric shaft 41, a ring gear 42, an eccentric gear 43, an output member 44, and a transmission mechanism 45. The eccentric shaft 41 is provided on an eccentric shaft center AX2 that is eccentric with respect to the rotary shaft center AX1, and is integrally formed with the rotary shaft 37. The ring gear 42 is provided coaxially with the rotation axis AX1 and is fixed to the rear housing 22. The eccentric gear 43 has an external tooth portion 47 that meshes with an internal tooth portion 46 of the ring gear 42, and is supported by a bearing 48 provided on the eccentric shaft 41 so as to allow a planetary motion. The planetary motion is a motion that revolves around the rotation axis AX1 while rotating around the eccentric axis AX2. The rotation velocity of the eccentric gear 43 during planetary motion is changed with respect to the rotation speed of the rotary shaft 37.

The output member 44 is provided coaxially with the rotation axis AX1 and is rotatably supported by a bearing 49 provided in the rear housing 22. The transmission mechanism 45 is composed of an engaging protrusion 51 formed in the eccentric gear 43 and an engaging hole 52 formed in the output member 44 into which the engaging protrusion 51 is inserted, and transmits the rotation of the eccentric gear 43 around the eccentric axis AX2 to the output member 44.

In the actuator 10, a rotating magnetic field is generated by switching an energizing phase of the coil 33, and the rotor 34 rotates under the magnetic attraction force or the reaction force generated by the rotating magnetic field. When the eccentric shaft 41 rotates around the rotation axis AX1 together with the rotor 34, the eccentric gear 43 makes a planetary motion, and the rotation of the eccentric gear 43 decelerated with respect to the rotation of the rotor 34 is output from the output member 44 to the outside.

(Motor Side Bearing)

Next, a configuration around a motor side bearing 35 will be described. In the following description, a direction parallel to a rotation axis AX1 is simply referred to as "axial direction", and a direction around the rotation axis AX1 is simply referred to as "circumferential direction".

Figure 2:
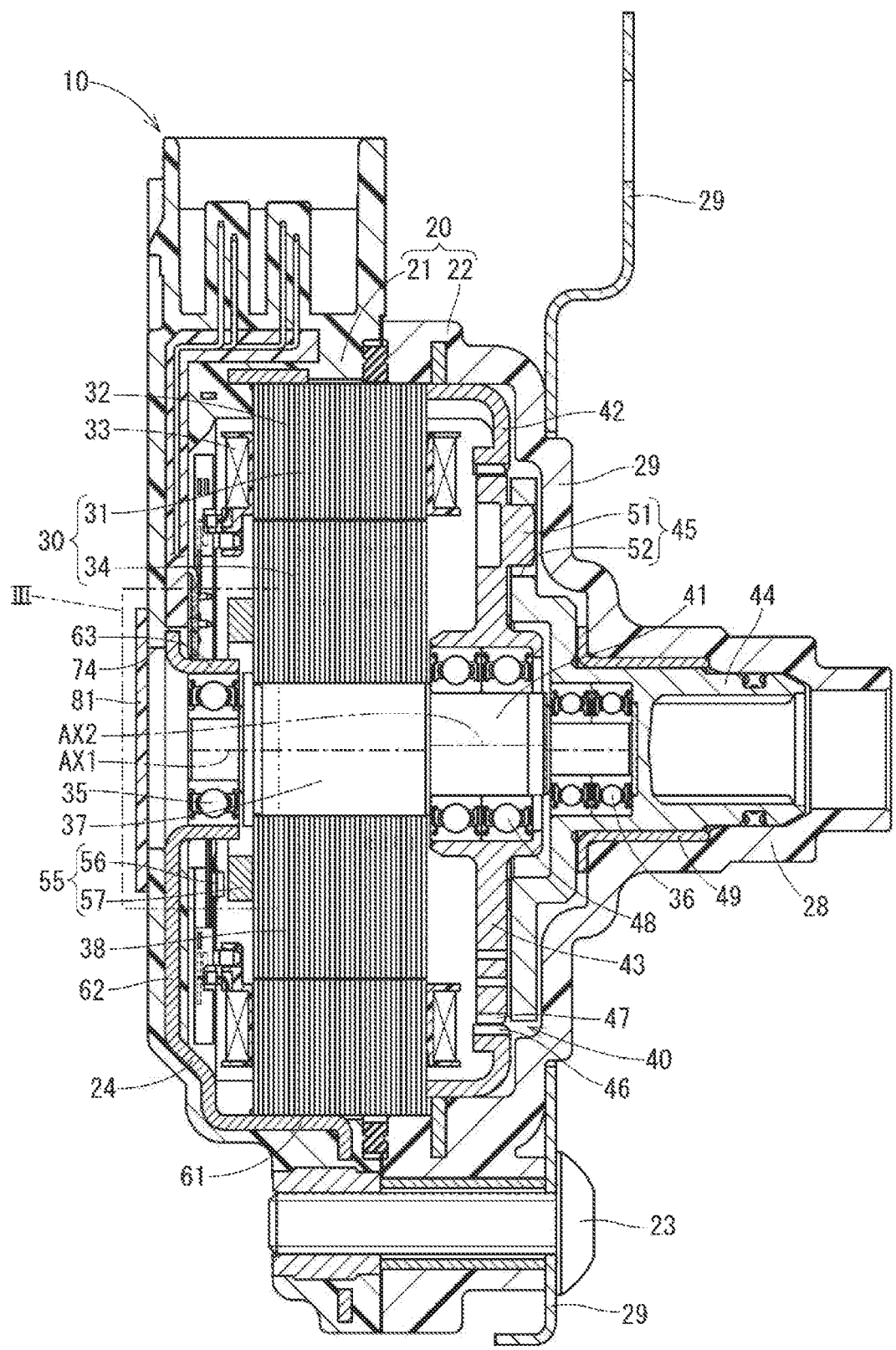
FIG. 2 is a cross-sectional view of the rotary actuator of the first embodiment.

As shown in FIG. 2, an actuator 10 has a position detection unit 55 that detects a rotational position of a rotor 34. The position detection unit 55 has a magnetic sensor 56 provided in a front housing 21 and a magnet 57 provided in a rotor core 38. The magnet 57 is an annular multipole magnet magnetized in the circumferential direction. The magnetic sensor 56 is arranged with a gap with respect to the magnet 57 in the axial direction.

A metal plate 24 has a cylindrical portion 61 into which the stator core 32 is press-fitted, a bottom portion 62 provided at one end of the cylindrical portion 61, and a cylindrical outer ring fixing portion 63 formed so as to project in the axial direction at a center of the bottom portion 62. The metal plate 24 is insert-molded into the front housing 21 made of resin. The outer ring fixing portion 63 is integrally formed with the front housing 21.

Figure 3:
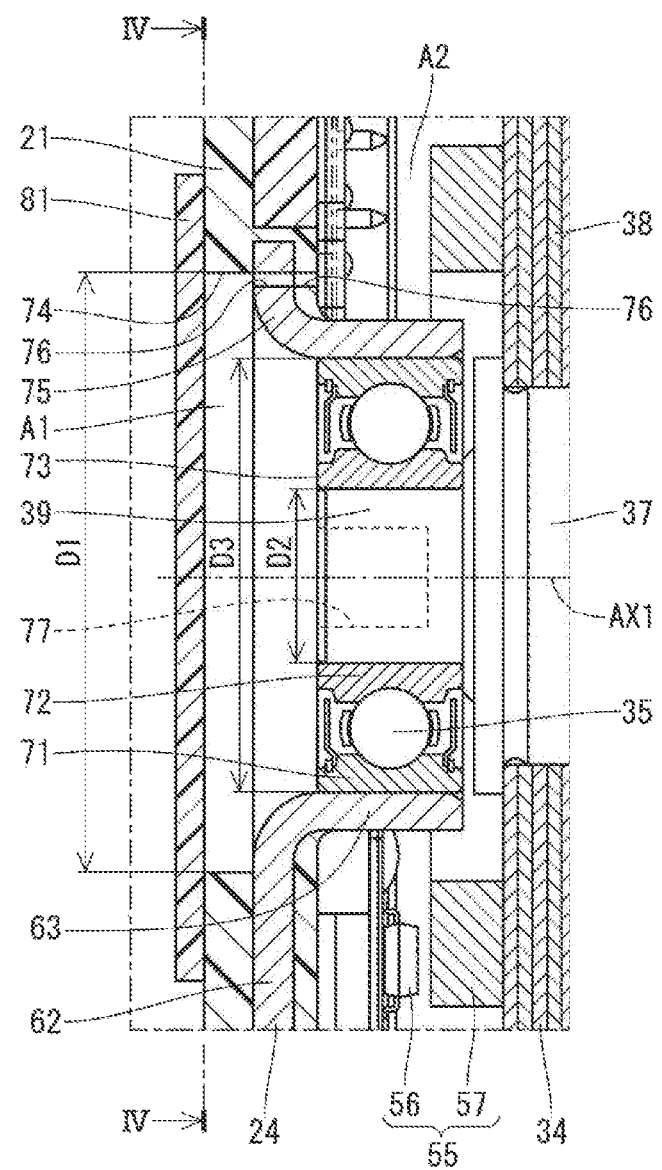
FIG. 3 is an enlarged view of Part III of FIG. 2.

As shown in FIG. 3, an outer ring 71 of the motor side bearing 35 is press-fitted and fixed to an inside of the outer ring fixing portion 63. An inner ring 72 of the motor side bearing 35 is press-fitted and fixed to an outside of one end 39 of the rotary shaft 37. Since both the outer ring 71 and the inner ring 72 of the motor side bearing 35 are fixed in this way, an axial movement of the rotor 34 with respect to the front housing 21 can be suppressed, and an amount of variation in a gap between the magnetic sensor 56 and the magnet 57 can be reduced. Therefore, the gap can be set as small as possible to increase a magnetic force acting on the magnetic sensor 56, and the magnetic force can be stabilized.

In the embodiment in which both the outer ring 71 and the inner ring 72 of the motor side bearing 35 are fixed as described above, it is necessary to receive a force applied to the inner ring 72 when the rotary shaft 37 is press-fitted into the inner ring 72 after the outer ring 71 is press-fitted and fixed. In the actuator, the outer ring fixing portion and the inner ring receiving portion are integrally provided on the metal plate, but there is a problem that it is difficult to manufacture the metal plate. To solve this problem, in the first embodiment, an inner ring receiving portion is removed from the actuator 10, and it is configured to receive the force applied to the inner ring 72 by the jig at the time of assembly. A detailed description will be given below.

The outer ring fixing portion 63 is formed in a simple cylindrical shape so as to hold the entire circumference of the outer ring 71. The inside is open with respect to the outer ring fixing portion 63, and the metal plate 24 is not provided with a portion for receiving the force applied to the inner ring 72.

Figure 4:
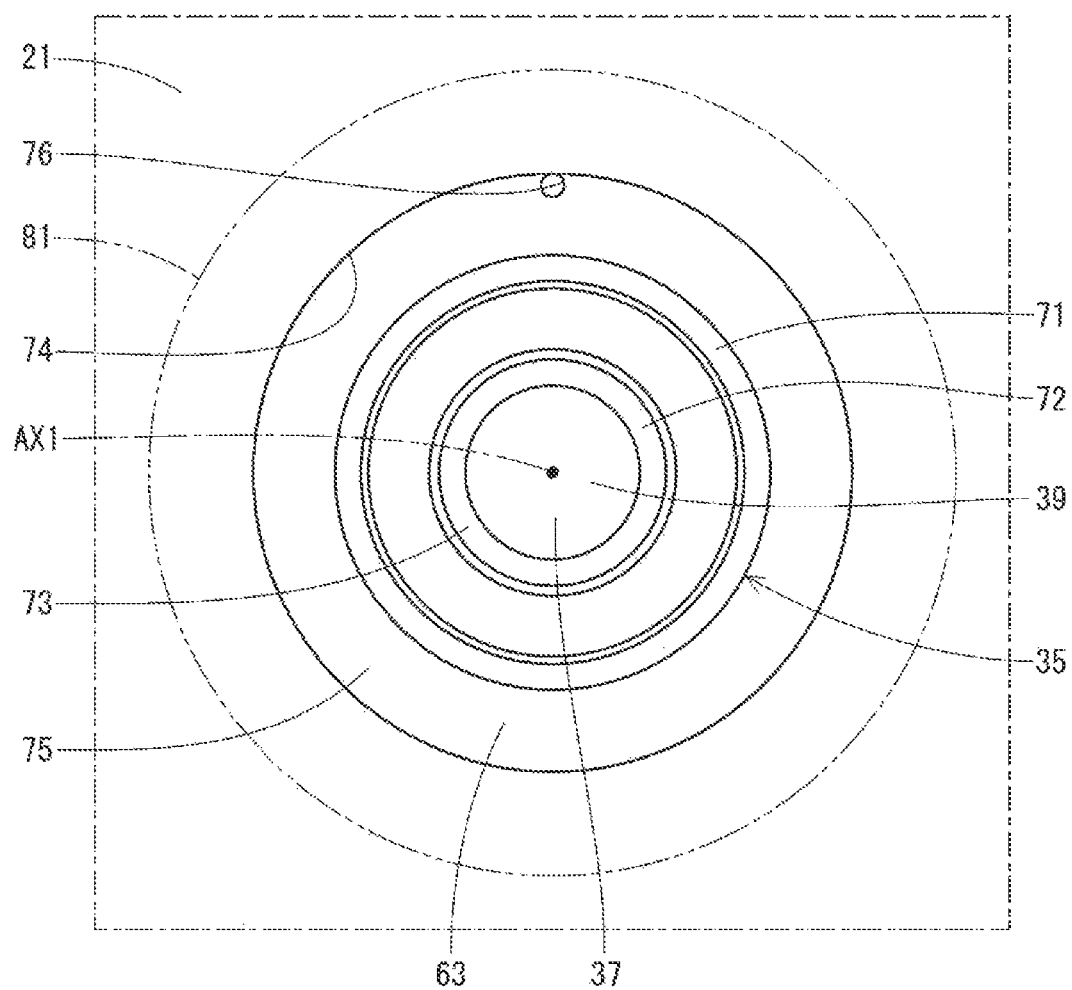
FIG. 4 is a plan view of a front housing and a motor side bearing of FIG. 3 as viewed from a IV-IV line.

As shown in FIGS. 3 and 4, the front housing 21 has a jig insertion hole 74 being an opening that overlaps with at least a part of one end surface 73 of the inner ring 72 in view from the axial direction. The jig insertion hole 74 is a through hole provided coaxially with the rotary shaft 37. An inner diameter D1 of the jig insertion hole 74 is larger than an inner diameter D2 of the inner ring 72. In the present embodiment, the jig insertion hole 74 is formed larger than the one end surface 73, and has an opening that overlaps the entire one end surface 73 in view from the axial direction.

Figure 5:
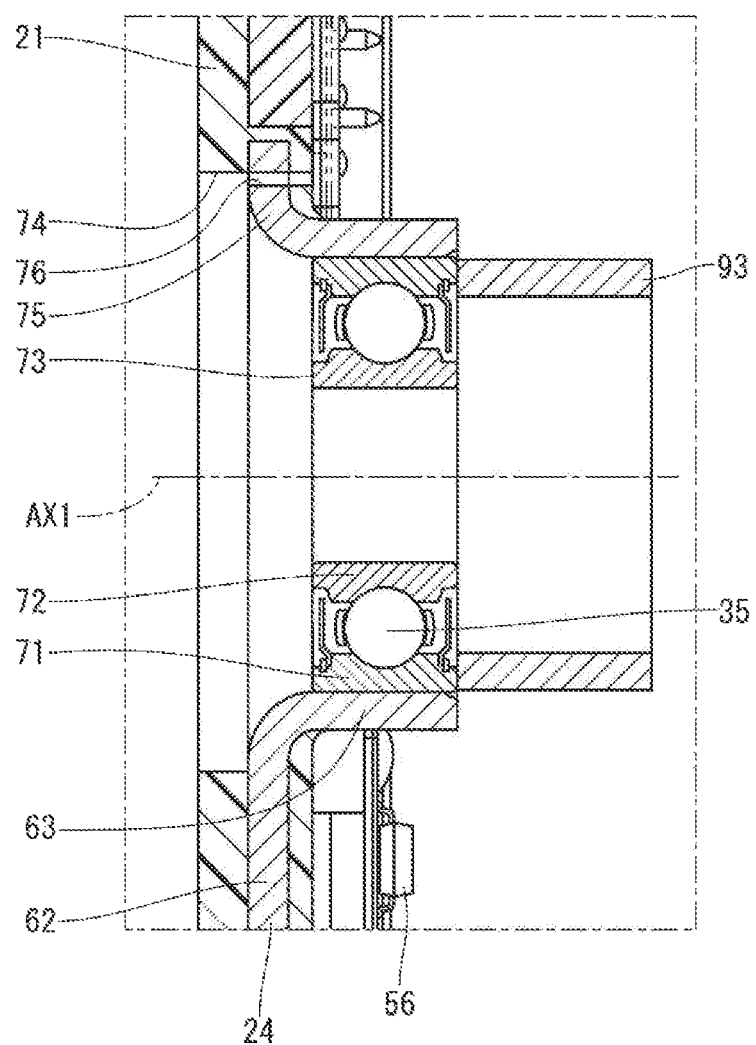
FIG. 5 is a diagram illustrating a procedure for assembling the motor side bearing of FIG. 3.
Figure 6:
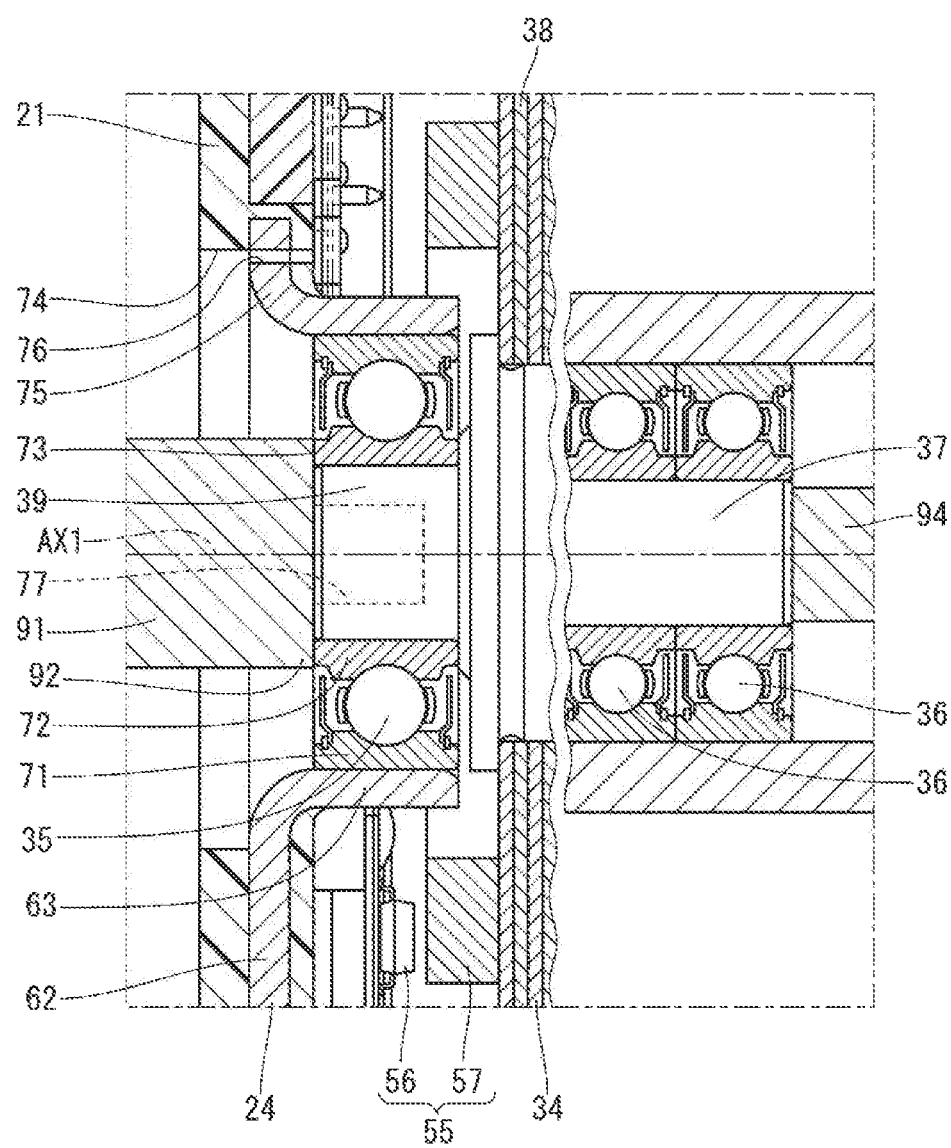
FIG. 6 is a diagram illustrating a procedure for assembling a rotating shaft of FIG. 3.

In a process of assembling the actuator 10, (1) the outer ring 71 is press-fitted into the outer ring fixing portion 63 as shown in FIG. 5, and then (2) one end 39 of the rotary shaft 37 is press-fitted into the inner ring 72 while receiving the force applied to the inner ring 72 by an inner ring receiving jig 91 inserted into the jig insertion hole 74 as shown in FIG. 6. The jig insertion hole 74 is a hole into which the inner ring receiving jig 91 can be inserted.

In FIG. 5, while pushing the outer ring 71 with a press-fit punch 93, the outer ring 71 is press-fitted with a constant stroke or until the outer ring 71 reaches a predetermined depth. On the other hand, as shown in FIG. 7, while pushing the outer ring 71 and the inner ring 72 with a press-fit punch 95, the outer ring 71 may be press-fitted until the inner ring 72 comes into contact with the inner ring receiving jig 91.

Figure 7:
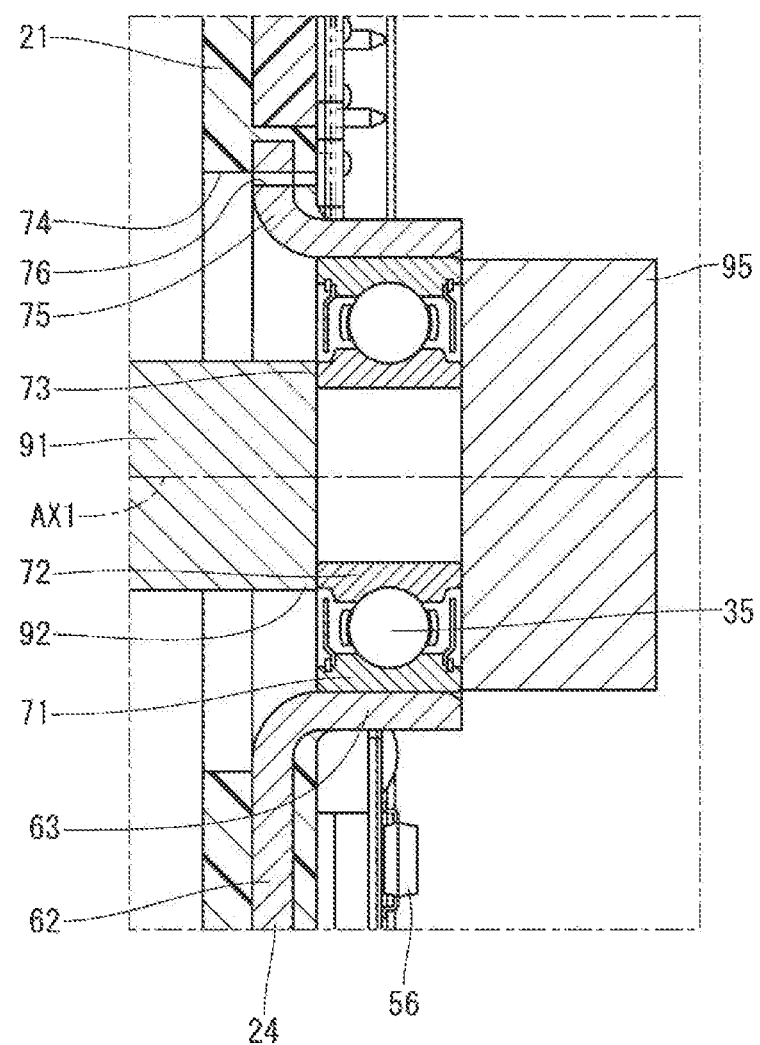
FIG. 7 is a diagram illustrating another procedure for assembling the motor side bearing of FIG. 3.

In FIGS. 5 and 7, the outer ring 71 is press-fitted while receiving, for example, the bottom side of the front housing 21. On the other hand, in another embodiment, the outer ring 71 may be press-fitted while receiving the outer ring fixing portion 63 by a jig inserted into the jig insertion hole 74. As shown in FIG. 3, the outer ring fixing portion 63 is formed so as to protrude from the bottom portion 62 toward the motor 30, and a base end portion 75 of the outer ring fixing portion 63 is suitable as a receiving part. The jig insertion hole 74 has the inner diameter D1 that is larger than the inner diameter D3 of the outer ring fixing portion 63 and has an opening that overlaps with the base end portion 75 in view from the axial direction.

In FIGS. 5 and 7, an outer diameter of the inner ring receiving jig 91 is smaller than an inner diameter of the jig insertion hole 74 and the outer ring fixing portion 63. On the other hand, in another embodiment, a fitting part that can be fitted with the jig insertion hole 74 or the outer ring fixing portion 63 is provided at a position one step lower than the inner ring receiving portion 92 at the tip of the inner ring receiving jig 91 that receives the inner ring 72 so that the inner ring receiving jig 91 and the inner ring 72 may be positioned using this fitting part. In this configuration, the jig insertion hole 74 or the outer ring fixing portion 63 also functions as a positioning portion.

Returning to FIG. 3, a seal member 81 is attached to the front housing 21 so as to close the jig insertion hole 74. The seal member 81 has a waterproof and breathable function. That is, the seal member 81 allows gas and vapor to enter and exit the housing 20 through the jig insertion hole 74, while preventing fixing and liquid from entering and exiting the housing 20 through the jig insertion hole 74.

The outer ring fixing portion 63 and the front housing 21 have a ventilation hole 76 for communicating a space A1 on the jig insertion hole 74 side and a space A2 on the opposite side thereof with respect to the motor side bearing 35.

A rotation transmission engaging portion 77 is formed at one end 39 of the rotary shaft 37 on the jig insertion hole 74 side. The rotation transmission engaging portion 77 is composed of, for example, a hexagonal hole or the like. The opening of the jig insertion hole 74 overlaps entirely with the rotation transmission engaging portions 77 in view from the axial direction.

(Effects)

As described above, in the first embodiment, the front housing 21 has the jig insertion hole 74 into which the inner ring receiving jig 91 can be inserted, and the jig insertion hole 74 is the opening that overlaps with at least a part of one end surface 73 of the inner ring 72 in view from the axial direction. By providing such a jig insertion hole 74, the inner ring 72 can be received by the inner ring receiving jig 91 inserted into the jig insertion hole 74 at the time of assembly. Therefore, it is not necessary to provide the inner ring receiving portion integrally with the outer ring fixing portion 63. Therefore, by fixing both the outer ring 71 and the inner ring 72 of the motor side bearing 35, the magnetic force of the position detection unit 55 is increased and stabilized, and the outer ring fixing portion 63 can be made into a simple cylindrical shape, which makes it easy to manufacture.

Further, in the first embodiment, the jig insertion hole 74 is formed larger than the one end surface 73, and has an opening that overlaps the entire one end surface 73 in view from the axial direction. Therefore, the entire surface of one end surface 73 can be received by the inner ring receiving jig 91.

Further, in the first embodiment, the seal member 81 is provided to prevent the fixing and the liquid from entering and exiting the housing 20 through the jig insertion hole 74. This makes it possible to prevent foreign matter from entering the housing 20 and increase the internal pressure while providing the jig insertion hole 74. Further, by providing the jig insertion hole 74 and the seal member 81 in place of the breathing hole and the filter conventionally provided on the transmission 11 side (outer wall of the rear housing 22) of the housing 20, since a clearance between the transmission 11 and the housing 20 is expanded, the mountability of the actuator 10 on the transmission 11 can be improved.

Further, in the first embodiment, the outer ring fixing portion 63 and the front housing 21 have a ventilation hole 76 for communicating a space A1 on the jig insertion hole 74 side and a space A2 on the opposite side thereof with respect to the motor side bearing 35. As a result, when an internal pressure of the housing 20 fluctuates, it is possible to breathe through the ventilation hole 76 (air flows between the space A1 and the space A2). Therefore, it is possible to prevent the grease of the motor side bearing 35 from leaking due to breathing through the inside of the motor side bearing 35, and to improve the life of the motor side bearing 35.

Further, in the first embodiment, the rotation transmission engaging portion 77 is formed at one end 39 of the rotary shaft 37 on the jig insertion hole 74 side. The opening of the jig insertion hole 74 overlaps entirely with the rotation transmission engaging portions 77 in view from the axial direction. This makes it possible to mechanically rotate the motor 30 from the outside using a rotating jig that is inserted into the jig insertion hole 74 and engaged with the rotation transmission engaging portion 77. For example, when the motor 30 fails, the parking lock can be forcibly released.

Second Embodiment

In the following description, a radial direction of the rotating shaft 37 is simply referred to as "radial direction".

Figure 8:
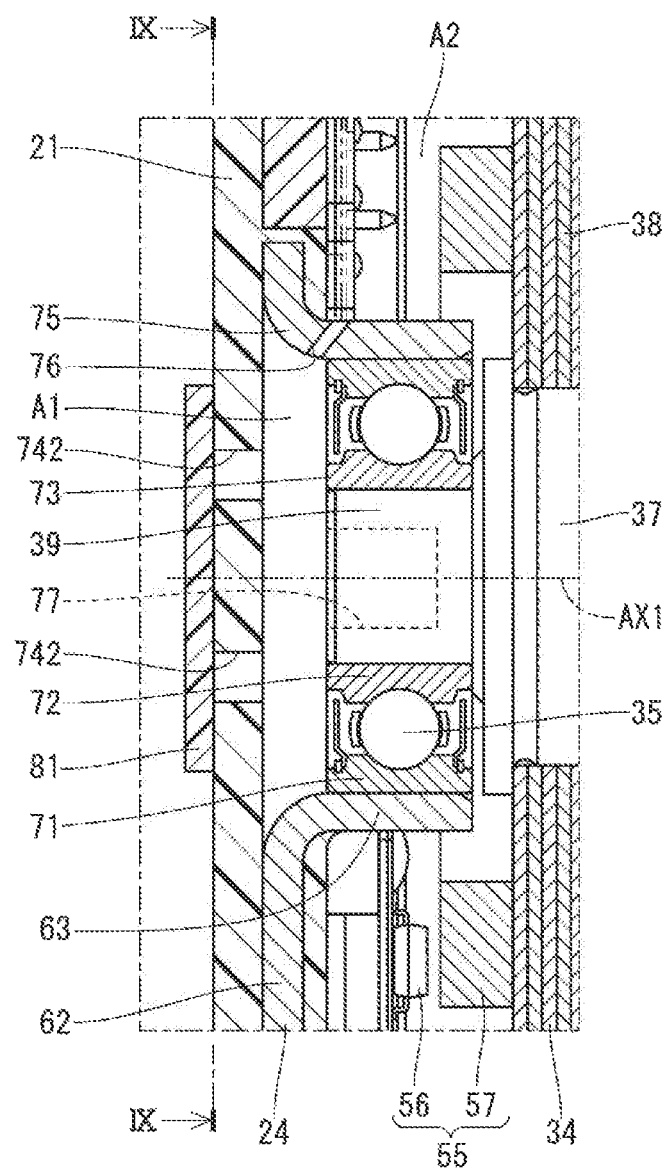
FIG. 8 is a diagram illustrating a jig insertion hole of the rotary actuator of a second embodiment, and is a diagram corresponding to FIG. 3 of the first embodiment.
Figure 9:
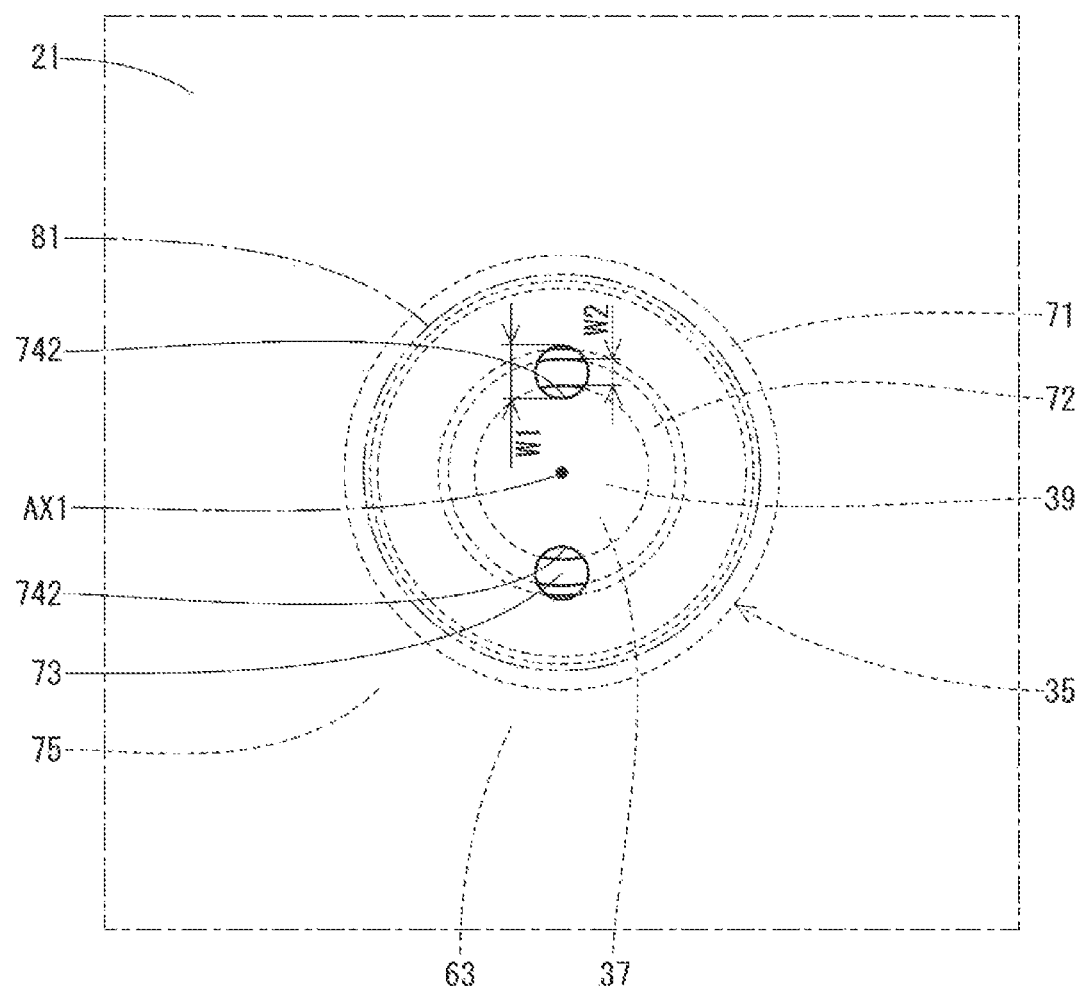
FIG. 9 is a plan view of the front housing and the motor side bearing of FIG. 8 as viewed from a IX-IX line.

In the second embodiment, as shown in FIGS. 8 and 9, a plurality of jig insertion holes 742 are provided so as to be arranged in the circumferential direction. A width W1 in the radial direction of the jig insertion hole 742 is larger than a width W2 in the radial direction of the one end surface 73. The radial position of the jig insertion hole 742 is substantially the same as the radial position of the one end surface 73. A part of the opening of the jig insertion hole 742 overlaps a part of one end surface 73 in view from the axial direction.

Figure 10:
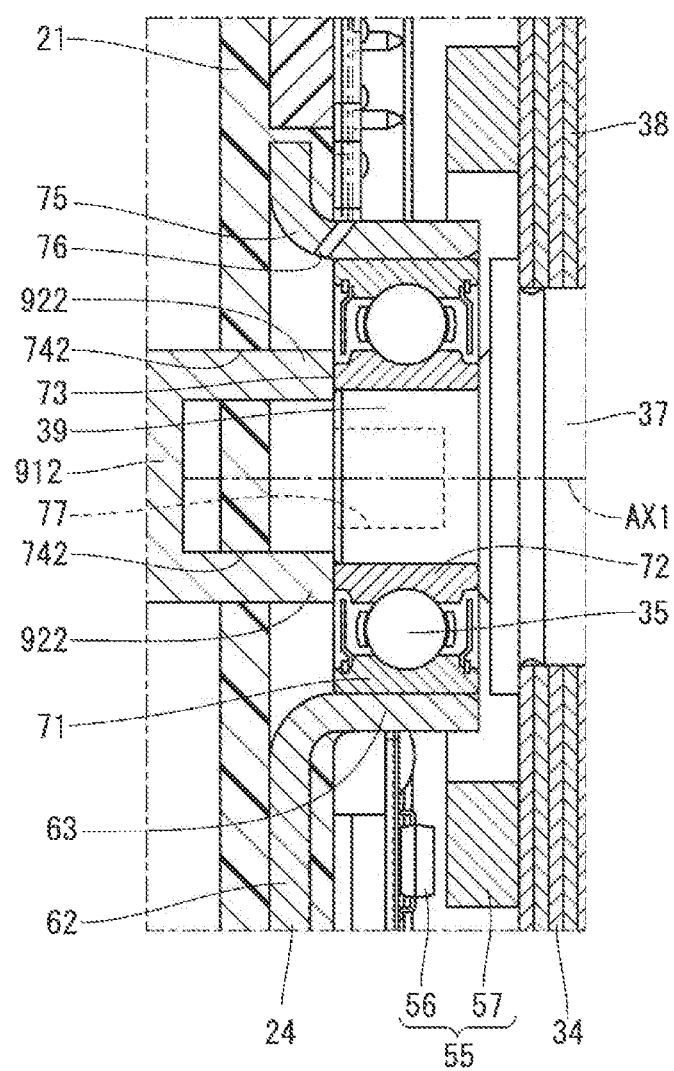
FIG. 10 is a diagram illustrating a procedure for assembling the rotating shaft of FIG. 8.

As shown in FIG. 10, an inner ring receiving jig 912 has two protruding inner ring receiving portions 922 inserted into the jig insertion hole 742. An outer diameter of the inner ring receiving portion 922 is substantially the same as an inner diameter of the jig insertion hole 742. By fitting the inner ring receiving portion 922 into the jig insertion hole 742, the inner ring receiving jig 912 and the inner ring 72 are positioned. In this configuration, the jig insertion hole 742 also functions as a positioning portion.

According to the actuator 10 of the second embodiment, it is easy to manufacture while increasing and stabilizing the magnetic force of the position detection unit 55 as in the first embodiment.

Third Embodiment

Figure 11:
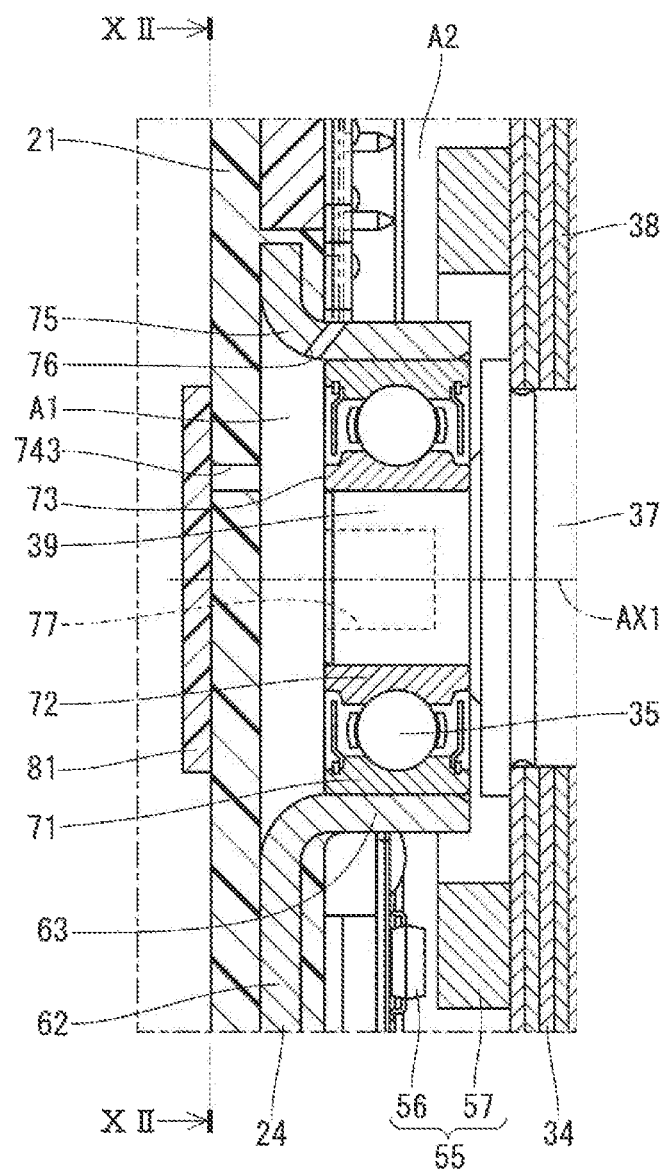
FIG. 11 is a diagram illustrating a jig insertion hole of the rotary actuator of a third embodiment, and is a diagram corresponding to FIG. 3 of the first embodiment.
Figure 12:
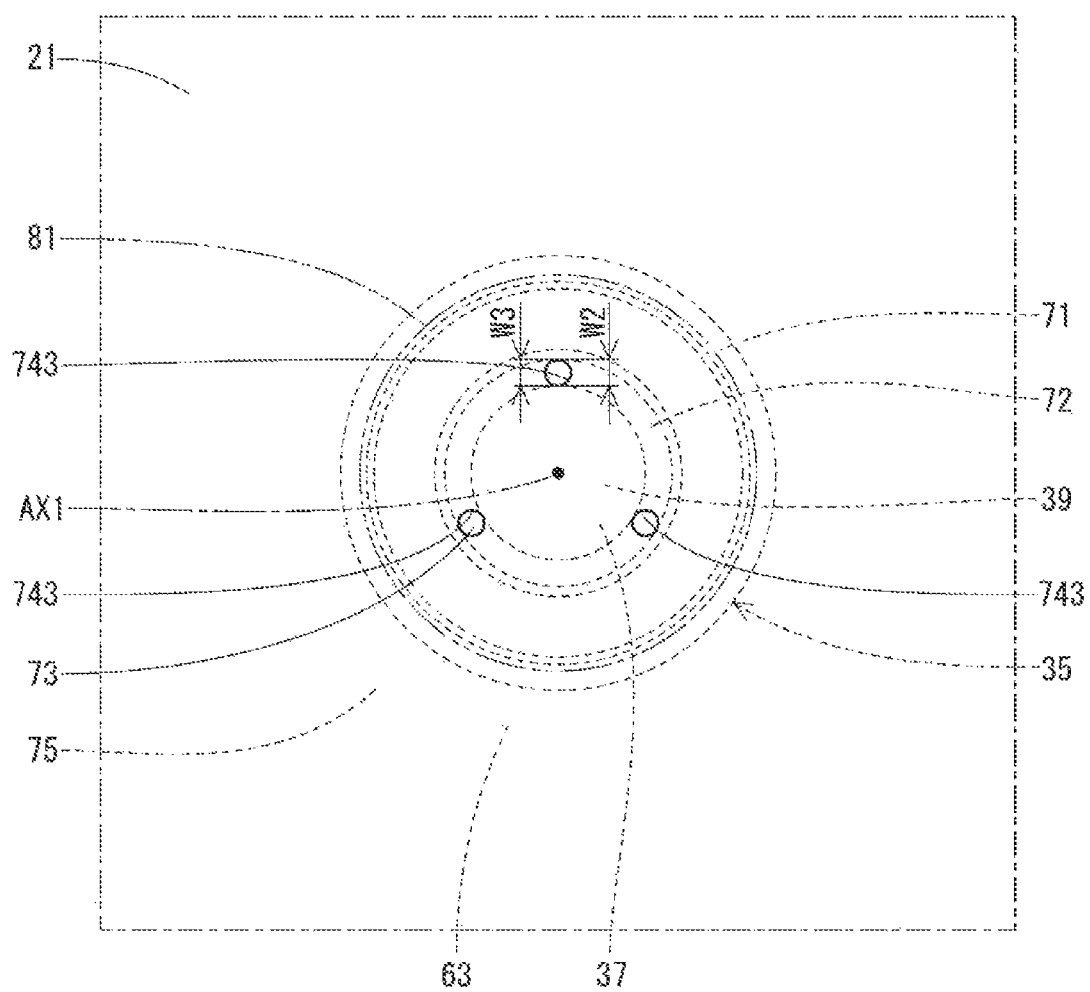
FIG. 12 is a view of the front housing and the motor side bearing of FIG. 11 as viewed from a XII-XII line.

In a third embodiment, as shown in FIGS. 11 and 12, a plurality of jig insertion holes 743 are provided so as to be arranged in the circumferential direction. In the present embodiment, three jig insertion holes 743 are provided at equal intervals in the circumferential direction. The radial width W3 of the jig insertion hole 743 is the same as the radial width W2 of the one end surface 73. The radial position of the jig insertion hole 743 is substantially the same as the radial position of the one end surface 73. The entire opening of the jig insertion hole 743 overlaps a part of one end surface 73 in view from the axial direction.

Figure 13:
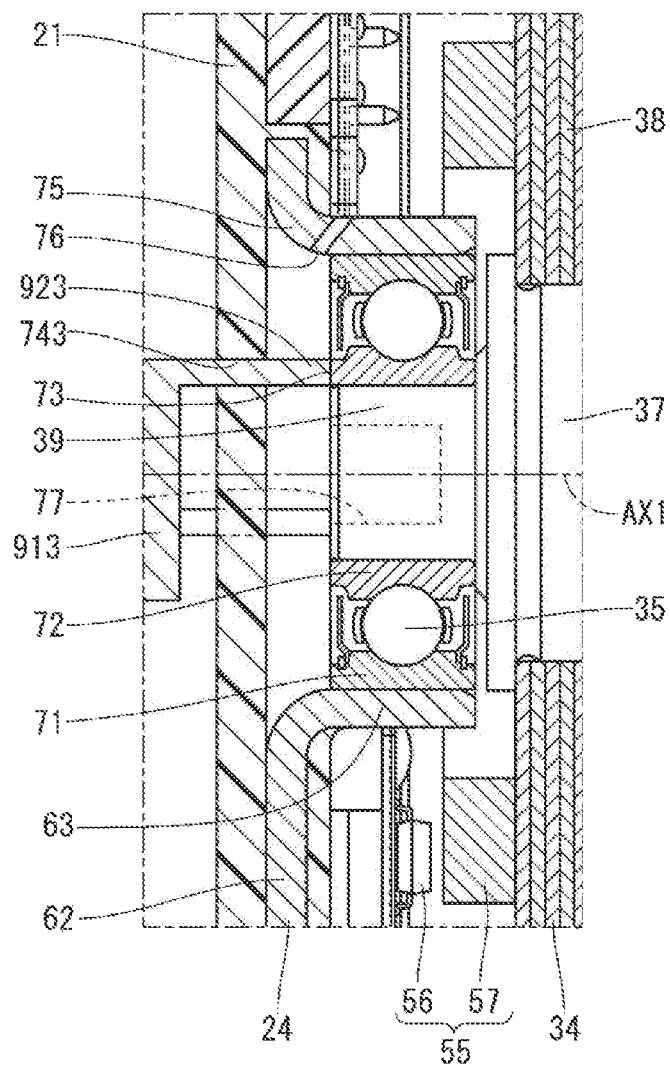
FIG. 13 is a diagram illustrating a procedure for assembling a rotating shaft of FIG. 12.

As shown in FIG. 13, the inner ring receiving jig 913 has two protruding inner ring receiving portions 923 that are inserted into the jig insertion hole 743. The outer diameter of the inner ring receiving portion 923 is substantially the same as the inner diameter of the jig insertion hole 743. By fitting the inner ring receiving portion 923 into the jig insertion hole 743, the inner ring receiving jig 913 and the inner ring 72 are positioned. In this configuration, the jig insertion hole 743 also functions as a positioning portion.

According to the actuator 10 of the third embodiment, it is easy to manufacture while increasing and stabilizing the magnetic force of the position detection unit 55 as in the first embodiment.

Fourth Embodiment

Figure 14:
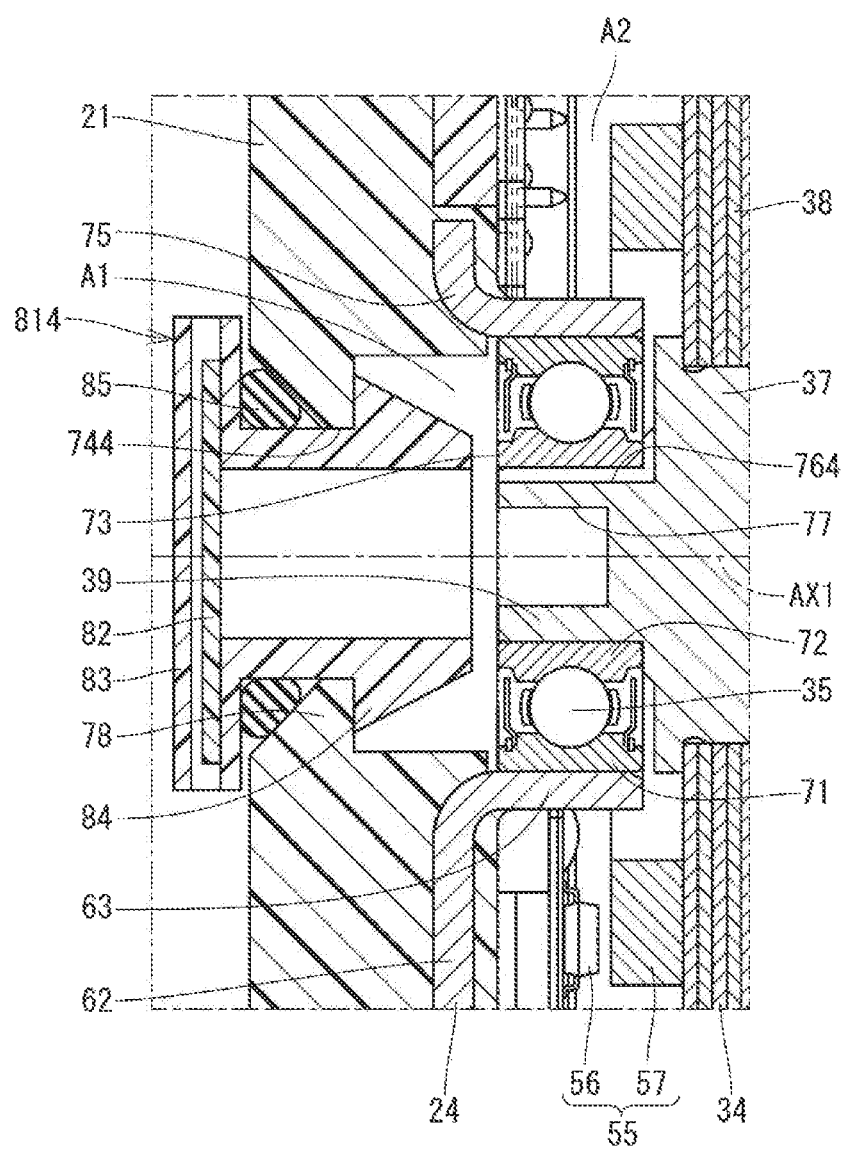
FIG. 14 is a diagram illustrating a jig insertion hole and a seal member of the rotary actuator of a fourth embodiment, and is a diagram corresponding to FIG. 3 of the first embodiment.

In a fourth embodiment, as shown in FIG. 14, an annular locking portion 78 protruding inward in the radial direction is provided on the side of the inner wall of the jig insertion hole 744 opposite to the motor side bearing 35. A seal member 814 has a film 82 having a waterproof and breathable function, a holding portion 83 for holding the film 82, a claw portion 84 which protrudes from the holding portion 83 into the jig insertion hole 744 and locks to the locking portion 78, and an O-ring 85 arranged between the holding portion 83 and the front housing 21. As described above, the seal member 814 may be a snap-fit type.

Further, in the fourth embodiment, the rotary shaft 37 has a ventilation hole 764 for communicating the space A1 and the space A2. The ventilation hole 764 is formed of a groove formed in one end 39 or the like of the rotary shaft 37. As a result, it is possible to breathe through the ventilation holes 764 when the internal pressure of the housing 20 fluctuates.

Fifth Embodiment

Figure 15:
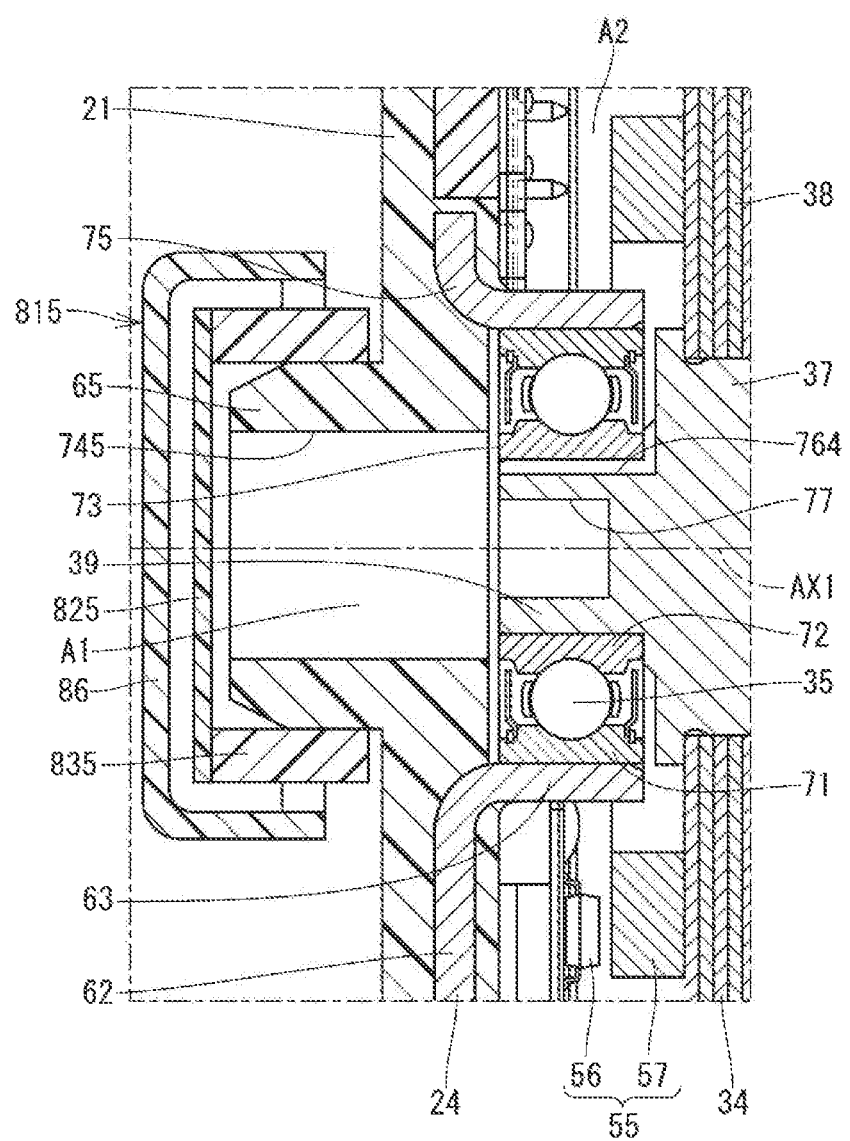
FIG. 15 is a diagram illustrating a jig insertion hole and a seal member of the rotary actuator of a fifth embodiment, and is a diagram corresponding to FIG. 3 of the first embodiment.

In a fifth embodiment, as shown in FIG. 15, a cylindrical protrusion 65 protruding in the axial direction on the outside of the jig insertion hole 745 is provided on the outer wall of the front housing 21. The seal member 815 has a film 825 having a waterproof and breathable function, a holding portion 835 that holds the film 825 and is press-fitted into the cylindrical protrusion 65, and a cover portion 86 provided so as to cover the film 825 on the outside of the holding portion 835. As described above, the seal member 815 may be an outer wall fixed type.

Sixth Embodiment

Figure 16:
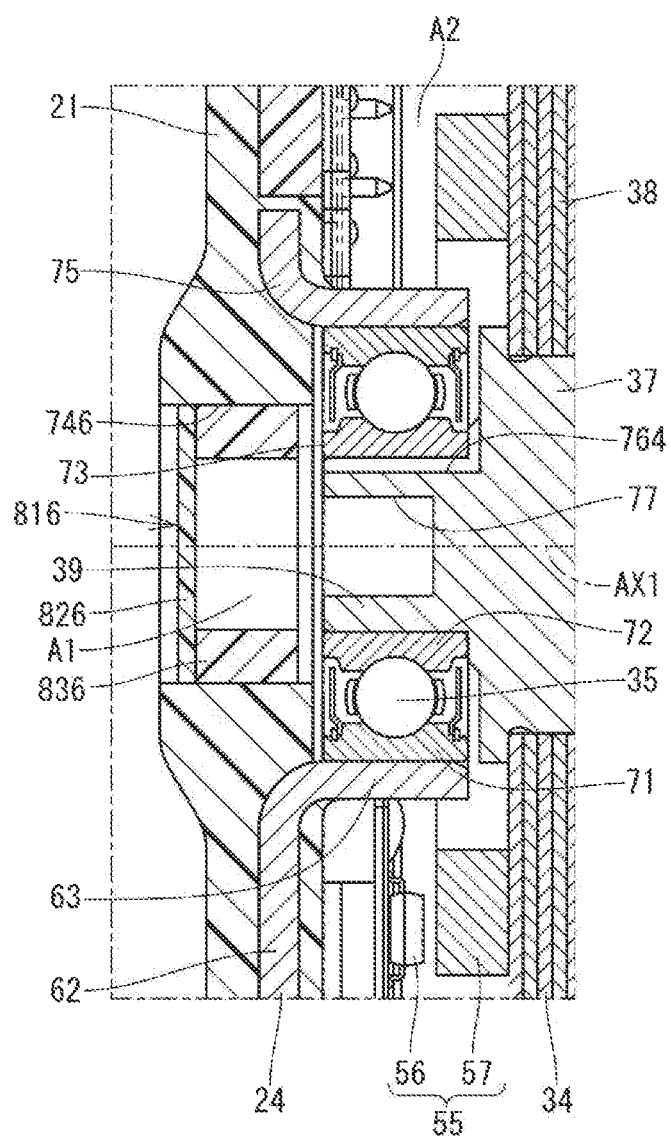
FIG. 16 is a diagram illustrating a jig insertion hole and a seal member of the rotary actuator of a sixth embodiment, and is a diagram corresponding to FIG. 3 of the first embodiment.

In a sixth embodiment, as shown in FIG. 16, the seal member 816 has a film 826 having a waterproof and breathable function and a holding portion 836 that holds the film 826 and is press-fitted into the inner wall of the jig insertion hole 746 . . . . As described above, the seal member 816 may be an inner wall fixed type.

The present disclosure is not limited to the embodiments described above, and various modifications are possible within the scope of the present disclosure without departing from the spirit of the invention.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:
1. A rotary actuator, comprising:
a motor;
a speed reducer configured to output after reducing a rotational speed of a rotary shaft of the motor;
a resin housing accommodating the motor and the speed reducer;
a bearing having an inner ring press-fitted and fixed to the rotary shaft and configured to support rotatably the rotary shaft;
a metal cylindrical outer ring fixing portion integrally provided on the housing by insert molding and to which an outer ring of the bearing is press-fitted and fixed;
a magnet provided on a rotor core integrated with the rotary shaft; and
a magnetic sensor provided in the housing so as to be arranged with a gap with respect to the magnet in an axial direction parallel to a rotation axis of the rotary shaft and being configured to detect a rotational position of the rotary shaft by a magnetism of the magnet,
wherein
the housing has a jig insertion hole into which an inner ring receiving jig is inserted, which has an opening overlapping with at least a part of one end surface of the inner ring in view of an axial direction parallel to a rotation axis of the rotary shaft; and
the outer ring fixing portion or the rotary shaft has a ventilation hole that communicates a space on a side of the fig insertion hole with respect to the bearing and a space on the side opposite to the jig insertion hole with respect to the bearing.

2. The rotary actuator according to claim 1, further comprising
a seal member that prevents solids and liquids from entering and exiting the housing through the jig insertion hole.

3. The rotary actuator according to claim 1, wherein
a rotation transmission engaging portion is formed at one end of the rotary shaft on the jig insertion hole side, and
the jig insertion hole has an opening that overlaps with the rotation transmission engaging portion in view from the axial direction.

4. A rotary actuator, comprising:
a motor including a stator core, a coil provided in the stator core, a rotary shaft, and a rotor core integral with the rotary shaft;
a speed reducer configured to output after reducing a rotational speed of the rotary shaft of the motor;
a resin housing accommodating the motor and the speed reducer;
a bearing having an outer ring and an inner ring press-fitted and fixed to the rotary shaft and configured to support rotatably the rotary shaft;
a metal plate having a cylindrical portion into which the stator core is press-fitted, a bottom portion provided at one end of the cylindrical portion, and a cylindrical outer ring fixing portion formed at a center of the cylindrical portion so as to protrude in an axial direction and having both axial ends open for press-fitting the outer ring, wherein the cylindrical portion and the bottom portion are integrally provided in the resin housing by insert molding;
a magnet provided on the rotor core; and
a magnetic sensor provided in the housing so as to be arranged with a gap with respect to the magnet in an axial direction parallel to a rotation axis of the rotary shaft and being configured to detect a rotational position of the rotary shaft by a magnetism of the magnet, wherein
the housing has a jig insertion hole into which an inner ring receiving jig is inserted, which has an opening overlapping with at least a part of one end surface of the inner ring in view of an axial direction parallel to a rotation axis of the rotary shaft; and
the jig insertion hole is formed on an inner side in a radial direction of a bottom holding portion of the housing that holds the bottom portion of the metal plate.

* * * * *